United States Patent
Tomoi

(10) Patent No.: US 8,921,483 B2
(45) Date of Patent: Dec. 30, 2014

(54) THERMOPLASTIC ELASTOMER COMPOSITION

(75) Inventor: Shusaku Tomoi, Hiratsuka (JP)

(73) Assignees: The Yokohama Rubber Co., Ltd., Tokyo (JP); ExxonMobil Chemical Patents Inc., Houston, TX (US)

( * ) Notice: Subject to any disclaimer, the term of this patent is extended or adjusted under 35 U.S.C. 154(b) by 0 days.

(21) Appl. No.: 14/113,063

(22) PCT Filed: Apr. 21, 2011

(86) PCT No.: PCT/US2011/033442
§ 371 (c)(1),
(2), (4) Date: Oct. 21, 2013

(87) PCT Pub. No.: WO2012/145005
PCT Pub. Date: Oct. 26, 2012

(65) Prior Publication Data
US 2014/0041781 A1    Feb. 13, 2014

(51) Int. Cl.
| | | |
|---|---|---|
| B60C 5/00 | (2006.01) | |
| C08L 25/08 | (2006.01) | |
| C08L 29/04 | (2006.01) | |
| C08L 51/06 | (2006.01) | |
| C08L 77/02 | (2006.01) | |
| B60C 1/00 | (2006.01) | |
| C08L 23/28 | (2006.01) | |

(52) U.S. Cl.
CPC ............. *B60C 1/0008* (2013.04); *C08L 23/283* (2013.01)
USPC ................ 525/66; 152/510; 525/57; 525/184

(58) Field of Classification Search
None
See application file for complete search history.

(56) References Cited

U.S. PATENT DOCUMENTS

| | | | |
|---|---|---|---|
| 5,364,909 A | 11/1994 | Guo et al. | |
| 7,935,763 B2* | 5/2011 | Chung et al. | 525/193 |
| 2002/0111432 A1* | 8/2002 | Obrecht et al. | 525/192 |
| 2006/0094829 A1* | 5/2006 | Chino et al. | 525/301 |
| 2008/0255310 A1 | 10/2008 | Tsou et al. | |
| 2009/0151841 A1 | 6/2009 | Jones et al. | |
| 2010/0331452 A1 | 12/2010 | Tsou et al. | |

FOREIGN PATENT DOCUMENTS

| | | |
|---|---|---|
| EP | 0969039 A1 | 2/1996 |
| EP | 0722850 A1 | 7/1996 |
| EP | 0857761 A1 | 8/1998 |
| WO | WO-2004/081107 A1 | 9/2004 |

* cited by examiner

*Primary Examiner* — Robert Sellers
(74) *Attorney, Agent, or Firm* — Novak Druce Connolly Bove + Quigg LLP

(57) ABSTRACT

In order to improve fatigue durability of a thermoplastic elastomer composition composed of a matrix phase of a thermoplastic resin and dispersed phases of a rubber, the thermoplastic elastomer composition comprises (A) 100 parts by weight of a halogenated poly(isoolefin-co-p-alkylstyrene) rubber, (B) 40 to 120 parts by weight of a polyamide resin, and (C) 0.5 to 10 parts by weight of an amine having at least one hydroxyl group. The amine (C) having at least one hydroxyl group is preferably a compound represented by formula (1):

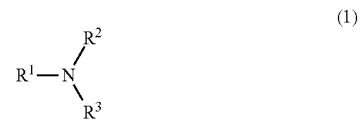

(1)

where $R^1$ is a $C_{1-30}$ alkyl; $R^2$ is $-(C_2H_4O)_n-H$, where n is an integer of 1 to 30; and $R^3$ is $-(C_2H_4O)_m-H$, where m is an integer of 1 to 30, a $C_{1-30}$ alkyl, or hydrogen.

20 Claims, No Drawings

THERMOPLASTIC ELASTOMER COMPOSITION

CROSS REFERENCE TO RELATED APPLICATIONS

This application is a National Phase filing under 35 U.S.C. §371 of PCT/US2011/033442 filed on Apr. 21, 2011, the entire contents of which are hereby incorporated by reference.

TECHNICAL FIELD

The present invention relates to a thermoplastic elastomer composition composed of a matrix phase of a thermoplastic resin and dispersed phases of rubber. More particularly, the present invention relates to a thermoplastic elastomer composition used for an inner liner of a pneumatic tire.

BACKGROUND ART

EP 0 722 850 A1 discloses a low-permeability thermoplastic elastomer composition that is superior as a gas-barrier layer in pneumatic tires. This thermoplastic elastomer composition comprises a low-permeability thermoplastic matrix, such as a polyamide or blends of polyamides, in which low-permeability rubber, such as brominated poly(isobutylene-co-p-methylstyrene), is dispersed.

In both EP 0 857 761 A1 and EP 0 969 039 A1, viscosity ratio between the thermoplastic matrix and the rubber dispersion was specified as a function of the volume fraction ratio and was brought close to a value of 1.0 in order to achieve phase continuity in thermoplastic resin and fine rubber dispersions. Criticality of smaller rubber dispersions was recognized in EP 0 969 039 A1 in a thermoplastic elastomer for delivering acceptable durability especially for its usage as inner liners in pneumatic tires.

WO 2004/081107 A1 discloses a method for controlling the size of a dispersed elastomer in a thermoplastic elastomer composition using a dispersion aid selected from tertiary amines and secondary diamines.

SUMMARY OF INVENTION

Technical Problem

An object of the present invention is to improve fatigue durability of a thermoplastic elastomer composition composed of a matrix phase of a thermoplastic resin and dispersed phases of rubber.

Solution to Problem

An aspect of the present invention is a thermoplastic elastomer composition comprising (A) 100 parts by weight of halogenated poly(isoolefin-co-p-alkylstyrene) rubber, (B) 40 to 120 parts by weight of a polyamide resin, and (C) 0.5 to 10 parts by weight of an amine having at least one hydroxyl group.

The amine (C) having at least one hydroxyl group is preferably a compound represented by formula (1):

where at least one of $R^1$, $R^2$, and $R^3$ is $-(C_2H_4O)_n-H$.

Preferably, $R^2$ is $-(C_2H_4O)_n-H$, where n is an integer of 1 to 30; and each of $R^1$ and $R^3$ independently is $-(C_2H_4O)_m-H$, where m is an integer of 1 to 30, a $C_{1-30}$ alkyl, or hydrogen.

More preferably, $R^1$ is a $C_{1-30}$ alkyl; $R^2$ is $-(C_2H_4O)_n-H$, where n is an integer of 1 to 30; and $R^3$ is $-(C_2H_4O)_m-H$, where m is an integer of 1 to 30, a $C_{1-30}$ alkyl, or hydrogen.

More preferably, $R^1$ is a $C_{1-30}$ alkyl; $R^2$ is $-(C_2H_4O)_n-H$, where n is an integer of 1 to 30; and $R^3$ is $-(C_2H_4O)_m-H$, where m is an integer of 1 to 30, or a $C_{1-30}$ alkyl.

More preferably, $R^1$ is a $C_{1-30}$ alkyl; $R^2$ is $-(C_2H_4O)_n-H$, where n is an integer of 1 to 30; and $R^3$ is $-(C_2H_4O)_m-H$, where m is an integer of 1 to 30.

The total number of oxyethylene repeating units $(C_2H_4O)$ in one molecule of the amine (C) having at least one hydroxyl group is preferably 1 to 30.

The alkyl preferably has 3 to 30 carbon atoms.

The halogenated poly(isoolefin-co-p-alkylstyrene) rubber (A) is preferably brominated poly(isobutylene-co-p-methylstyrene) rubber.

The halogenated poly(isoolefin-co-p-alkylstyrene) rubber preferably has been dynamically vulcanized.

The polyamide resin (B) is preferably at least one selected from the group consisting of nylon 6, nylon 66, nylon 46, nylon 11, nylon 12, nylon 69, nylon 610, nylon 612, nylon 6/66, nylon 6/66/12, nylon 6/66/610, nylon MXD6, nylon 6T, nylon 6/6T, nylon 9T, and aromatic nylon.

The thermoplastic elastomer composition preferably further comprises 5 to 100 parts by weight of an acid-modified polymer, based on 100 parts by weight of the halogenated poly(isoolefin-co-p-alkylstyrene) rubber (A).

The acid-modified polymer is preferably at least one selected from the group consisting of an acid-modified olefin copolymer, an acid-modified styrene-olefin copolymer, an acid-modified ethylene-unsaturated carboxylic acid copolymer, and an acid-modified ethylene-unsaturated carboxylate copolymer.

Another aspect of the present indention is a pneumatic tire comprising an inner liner comprising the above thermoplastic elastomer composition.

Advantageous Effects of Invention

According to the present invention, by blending an amine having a hydroxyl group in a thermoplastic elastomer composition composed of a matrix phase of a thermoplastic resin and dispersed phases of rubber, the affinity between the matrix phase and the dispersed phases in the interface therebetween improves, and the thermoplastic elastomer composition has improved fatigue durability.

DESCRIPTION OF EMBODIMENTS

The thermoplastic elastomer composition according to the present invention comprises (A) 100 parts by weight of a halogenated poly(isoolefin-co-p-alkylstyrene) rubber, (B) 40 to 120 parts by weight of a polyamide resin, and (C) 0.5 to 10 parts by weight of an amine having at least one hydroxyl group.

In a preferable embodiment, the halogenated poly(isoolefin-co-p-alkylstyrene) rubber includes copolymers of isoolefin and p-alkylstyrene, as described for example in EP 0 344 021 A2. The copolymers preferably have a substantially homogeneous compositional distribution. Preferable alkyl groups for the p-alkyl styrene moiety include alkyl groups having from 1 to 5 carbon atoms, primary haloalkyl groups having from 1 to 5 carbon atoms, secondary haloalkyl groups having from 1 to 5 carbon atoms and mixtures thereof. The copolymer preferably comprises isobutylene and p-methylstyrene. The halogen includes chlorine, bromine, and iodine, and is preferably bromine. In other words, the halogenated poly(isoolefin-co-p-alkylstyrene) rubber is preferably a brominated poly(isobutylene-co-p-methylstyrene) rubber.

Suitable halogenated poly(isoolefin-co-p-alkylstyrene) rubbers include copolymers (such as a brominated poly(isobutylene-co-p-methylstyrene)) having a number average molecular weight Mn of at least 50,000, more preferably at least 75,000, even more preferably at least 100,000, most preferably at least 150,000. The copolymers may also have a ratio of weight average molecular weight (Mw) to number average molecular weight (Mn), i.e., Mw/Mn of less than 6, preferably less than 4, more preferably less than 2.5, most preferably less than 2.0.

The halogenated poly(isoolefin-co-p-alkylstyrene) rubber preferably has a Mooney Viscosity (ML 1+8 at 125° C., ASTM D1646, modified) of 20 to 70, more preferably 25 to 55.

The halogenated poly(isoolefin-co-p-alkylstyrene) rubber (A) can be prepared by copolymerizing isoolefin, preferably isobutylene, and p-alkylstyrene, preferably p-methylstyrene, followed by halogenation. The amount of p-alkylstyrene is 0.5 to 25 percent by weight, preferably 2 to 20 percent by weight, based on the total amount of the comonomers. The content of halogen, e.g., Br and/or Cl, preferably Br, is preferably less than 10 percent by weight, more preferably 0.1 to 7 percent by weight, based on the total amount of the copolymer.

The copolymerization can be carried out in a known manner as described in, for example, EP 0 344 021 A2 published on Nov. 29, 1989, and the halogenation can be carried out in a known method as described in, for example, U.S. Pat. No. 4,548,995.

The polyamide resins usable in the present invention include crystalline or resinous, high molecular weight solid polymers, including copolymers and terpolymers, having amide repeating units within the polymer chain. Polyamide resins may be prepared by polymerization of one or more of lactams, such as ε-caprolactam, pyrrolidone, lauryl lactam and aminoundecanelactam, or amino acid, or by condensation of dibasic acids and diamines. Both fiber-forming and molding grade nylons are suitable. Examples of such polyamide resins are polycaprolactam (nylon 6), polylauryllactam (nylon 12), polyhexamethyleneadipamide (nylon 66), polyhexamethyleneazelamide (nylon 69), polyhexamethylenesebacamide (nylon 610), polyhexamethyleneisophthalamide (nylon 6IP), and the condensation product of 11-aminoundecanoic acid (nylon 11). Nylon 46, nylon 612, nylon 6/66 copolymers, nylon 6/66/12, nylon 6/66/610, nylon MXD6, nylon 6T, nylon 6/6T, nylon 9T and aromatic nylons may also be used. Copolymers thereof and any blends thereof may also be used. Additional examples of satisfactory polyamide resins (especially those having a softening point below 275° C.) are described in Kirk-Othmer, Encyclopedia of Chemical Technology, vol. 10, page 919, and Encyclopedia of Polymer Science and Technology, vol. 10, pages 392-414. Commercially available polyamide resins may be advantageously used in the practice of the present invention, with linear crystalline polyamides having a softening point or melting point of 160° C. to 230° C. being preferable.

The content of the polyamide resin (B) is 40 to 120 parts by weight, preferably 60 to 100 parts by weight, based on 100 parts by weight of the halogenated poly(isoolefin-co-p-alkylstyrene) rubber (A). If the content of the polyamide resin (B) is too low, the polyamide resin will not form a matrix phase, and gas barrier properties or process-ability will decrease. Conversely, if the content of the polyamide resin (B) is too high, the flexibility of the composition will decrease, and the fatigue durability will decrease.

The thermoplastic elastomer composition of the present invention comprises an amine (C) having at least one hydroxyl group. The amine (C) having at least one hydroxyl group improves the affinity between the halogenated poly(isoolefin-co-p-alkylstyrene) rubber (A) and the polyamide resin (B) in the interface therebetween, and improves the fatigue durability of the thermoplastic elastomer composition.

The amine (C) having at least one hydroxyl group is preferably a compound represented by formula (1):

(1)

where at least one of $R^1$, $R^2$, and $R^3$ is —$(C_2H_4O)_n$—H.

In a preferable embodiment, $R^2$ is —$(C_2H_4O)_n$—H, where n is an integer of 1 to 30; and each of $R^1$ and $R^3$ independently is —$(C_2H_4O)_m$—H, where m is an integer of 1 to 30, a $C_{1-30}$ alkyl, or hydrogen.

In a more preferable embodiment, $R^1$ is a $C_{1-30}$ alkyl; $R^2$ is —$(C_2H_4O)_n$—H, where n is an integer of 1 to 30; and $R^3$ is —$(C_2H_4O)_m$—H, where m is an integer of 1 to 30, a $C_{1-30}$ alkyl, or hydrogen.

In an even more preferable embodiment, $R^1$ is a $C_{1-30}$ alkyl; $R^2$ is —$(C_2H_4O)_n$—H, where n is an integer of 1 to 30; and $R^3$ is —$(C_2H_4O)_m$—H, where m is an integer of 1 to 30, or a $C_{1-30}$ alkyl.

In an even more preferable embodiment, $R^1$ is a $C_{1-30}$ alkyl; $R^2$ is —$(C_2H_4O)_n$—H, where n is an integer of 1 to 30; and $R^3$ is —$(C_2H_4O)_m$—H, where m is an integer of 1 to 30.

Hereinafter, —$(C_2H_4O)_n$—H and —$(C_2H_4O)_m$—H are also referred to as (poly)oxyethylene group. As used herein, "(poly)" means that the number of oxyethylene repeating unit ($C_2H_4O$) is one or more. In other words, a (poly)oxyethylene group means both a polyoxyethylene group —$(C_2H_4O)_n$—H, where n is equal to or more than 2, and an oxyethylene group —$C_2H_4OH$.

The total number of oxyethylene repeating unit ($C_2H_4O$) in one molecule of the amine (C) having at least one hydroxyl group is preferably 1 to 30, more preferably 2 to 20. For example, if $R^1$ is an alkyl, $R^2$ is —$(C_2H_4O)_n$—H and $R^3$ is —$(C_2H_4O)_m$—H, then the sum of n and m is preferably 1 to 30, more preferably 2 to 20; n and m may be the same or different. If the total number of oxyethylene repeating units is less than one, then the amine (C) has no oxyethylene group, and therefore the polarity of the amine decreases, and the affinity of the amine for the nylon resin decreases. Conversely, if the total number of oxyethylene repeating unit in one molecule of the amine (C) is too large, then the concentration of hydroxyl group in one molecule will decrease, and the affinity of the amine for the nylon resin will decrease, and also flexible molecule chains will increases and there is a concern that the barrier properties will decrease. As long as the total number of oxyethylene repeating units is within the preferable range, each of n and m is not limited, but more preferably it is 1 to 10.

It is believed that a (poly)oxyethylene group has affinity for the polyamide resin (B) in the interface between the halogenated poly(isoolefin-co-p-alkylstyrene) rubber (A) and the polyamide resin (B).

As used herein, a $C_{1-30}$ alkyl means an alkyl having 1 to 30 carbon atoms.

The alkyl is preferably an alkyl having 8 to 30 carbon atoms (a $C_{8-30}$ alkyl), more preferably an alkyl having 12 to 18 carbon atoms. It is believed that the alkyl has affinity for the halogenated poly(isoolefin-co-p-alkylstyrene) rubber (A) in the interface between the halogenated poly(isoolefin-co-p-alkylstyrene) rubber (A) and the polyamide resin (B).

In the most preferable embodiment, the amine (C) having at least one hydroxyl group is a tertiary amine represented by the formula (1),

(1)

where $R^1$ is a $C_{8-30}$ alkyl, $R^2$ is —$(C_2H_4O)_n$—H, and $R^3$ is —$(C_2H_4O)_m$—H, where n+m is 1 to 30. n and m may be the same or different.

Examples of $R^1$ include dodecyl, tetradecyl, hexadecyl, octadecyl, and the like.

Examples of $R^2$ include —$C_2H_4OH$, —$(C_2H_4O)_2$—H, —$(C_2H_4O)_3$—H, —$(C_2H_4O)_4$—H, —$(C_2H_4O)_5$—H, —$(C_2H_4O)_{10}$—H, —$(C_2H_4O)_{15}$—H, —$(C_2H_4O)_{20}$—H, —$(C_2H_4O)_{30}$—H and the like.

Examples of $R^3$ include hydrogen, dodecyl, tetradecyl, hexadecyl, octadecyl, —$C_2H_4OH$, —$(C_2H_4O)_2$—H, —$(C_2H_4O)_3$—H, —$(C_2H_4O)_4$—H, —$(C_2H_4O)_5$—H, —$(C_2H_4O)_{10}$—H, —$(C_2H_4O)_{15}$—H, —$(C_2H_4O)_{20}$—H, —$(C_2H_4O)_{30}$—H and the like.

Examples of the amine (C) having at least one hydroxyl group include, but are not limited to, $C_{12}H_{25}$—NH—$C_2H_4OH$, $C_{12}H_{25}$—N(—$C_2H_4OH)_2$, $C_{14}H_{29}$—N(—($C_2H_4O)_{15}$—H)$_2$, $C_{16}H_{33}$—N(—($C_2H_4O)_{15}$—H)$_2$, $C_{18}H_{37}$—N(—$C_2H_4OH)_2$, $C_{18}H_{37}$—N(—($C_2H_4O)_2$—H)(—($C_2H_4O)_3$—H), $C_{18}H_{37}$—N(—($C_2H_4O)_{10}$—H)$_2$, $C_{18}H_{37}$—N(—($C_2H_4O)_{15}$—H)$_2$, and mixtures thereof.

The thermoplastic elastomer composition of the present invention may further comprise an acid-modified polymer. Incorporation of an acid-modified polymer can provide the thermoplastic elastomer composition with improved fatigue durability and procsssability.

The acid-modified polymer includes an acid-modified olefin copolymer, an acid-modified styrene-olefin copolymer, an acid-modified ethylene-unsaturated carboxylic acid copolymer, and an acid-modified ethylene-unsaturated carboxylate copolymer.

The acid-modified olefin copolymer includes an ethylene-α-olefin copolymer modified by maleic anhydride, such as an ethylene-propylene copolymer, an ethylene-butene copolymer, an ethylene-hexene copolymer, an ethylene-octene copolymer and the like, modified by maleic anhydride.

The acid-modified styrene-olefin copolymer includes a styrene-ethylene-butylene-styrene block copolymer, styrene-ethylene-propylene-styrene block copolymer, and the like, modified by maleic anhydride.

The acid-modified ethylene-unsaturated carboxylic acid copolymer includes an ethylene-acrylic acid copolymer, ethylene-methacrylic acid copolymer, and the like, modified by maleic anhydride.

The acid-modified ethylene-unsaturated carboxylate copolymer includes an ethylene-methyl acrylate copolymer, ethylene-ethyl acrylate copolymer, ethylene-methyl methacrylate copolymer, and the like, modified by maleic anhydride.

A maleic anhydride-modified polymer can be prepared, for example, by reacting a polymer with an acid anhydride and a peroxide. The content of acid anhydride group in the modified polymer is preferably 0.01 to 1 mol/kg, more preferably 0.05 to 0.5 mol/kg. If the content of the acid anhydride group is too low, the modified polymer will not be dispersed well. Conversely, if the content of the acid anhydride group is too high, processability will decrease.

Acid-modified polymers are commercially available, and commercially available acid-modified polymers can be used for the present invention. Commercially available acid-modified polymers include a maleic anhydride-modified ethylene-propylene copolymer TAFMER® MP-0620 and a maleic anhydride-modified ethylene-butene copolymer TAFMER® MH-7010 sold by Mitsui Chemicals, Inc., and the like.

The content of acid-modified polymer is preferably 5 to 100 parts by weight, more preferably 5 to 50 parts by weight, based on 100 parts by weight of the halogenated poly(isoolefin-co-p-alkylstyrene) rubber (A). If the content of acid-modified polymer is too low, improvement in fatigue durability cannot be expected. Conversely, if the content of acid-modified polymer is too high, the processability will decrease due to gelation, phase inversion, and the like.

The thermoplastic elastomer composition of the present invention can further comprise a thermoplastic resin, such as an ethylene-vinyl alcohol copolymer and a poly(vinyl alcohol), in addition to the polyamide resin. Incorporation of an ethylane-vinyl alcohol copolymer or a poly(vinyl alcohol) can improve air barrier properties of the thermoplastic elastomer composition.

An ethylene-vinyl alcohol copolymer (hereinafter also referred to as "EVOH") is a copolymer consisting essentially of an ethylene unit (—$CH_2CH_2$—) and a vinyl alcohol unit (—$CH_2$—CH(OH)—), and it may contain other constitutional units, in addition to the ethylene unit and vinyl alcohol unit, in such an amount that they may not inhibit the effect of the present invention. The ethylene-vinyl alcohol copolymer preferably has a content of ethylene unit of 1 to 55 percent by mole, more preferably 20 to 50 percent by mole. If the ethylene-vinyl alcohol copolymer has too low a content of ethylene unit, the flexibility of one ethylene-vinyl alcohol copolymer will decrease and the fatigue durability will decrease. Conversely, if it has too high a content of ethylene unit, the air barrier properties will decrease. An ethylene-vinyl alcohol copolymer is obtained by saponifying an ethylene-vinyl acetate copolymer, and the degree of saponification is preferably not less than 90 percent, more preferably not less than 99 percent. If the ethylene-vinyl alcohol copolymer has a too low degree of saponification, the air barrier properties will decrease and the heat stability will also decrease. Ethylene-vinyl alcohol copolymers are commercially available, for example, in the trade name of Soarnol® from the Nippon Synthetic Chemical Industry Co., Ltd. and in the trade name of EVAL® from Kuraray Co., Ltd. Commercially available ethylene-vinyl alcohol copolymers having a content of ethylene unit of 1 to 55 percent by mole and a degree of saponification of not less than 90 percent include Soarnol® H4815B having a content of ethylene unit of 48 percent by mole and a degree of saponification of not less than 99 percent, Soarnol® A4412B having a contents of ethylene unit of 44 percent by mole and a degree of saponification of not less than 99 percent, Soarnol® DC3212B having a content of ethylene unit of 32 percent by mole and a degree of saponification of not less than 99 percent, and Soarnol® V2504RB having a content of ethylene unit of 25 percent by mole and a degree of saponification of not less than 99 percent, sold by the Nippon Synthetic Chemical Industry Co., Ltd., and EVAL® L171B having a content of ethylene unit of 27 percent by mole and a degree of saponification of not less than 99 percent, EVAL® H171B having a content of ethylene unit of 38 percent by mole and a degree of saponification of not less than 99 percent, and EVAL® E171B having a content of ethylene unit of 44 percent by mole and a degree of saponification of not less than 99 percent, sold by Kuraray Co., Ltd., and the like.

A poly(vinyl alcohol) (hereinafter also referred to as "PVA") is a polymer consisting essentially of a vinyl alcohol unit (—$CH_2$—CH(OH)—), and it may contain other constitutional units, in addition to a vinyl alcohol unit, in such an amount that they may not inhibit the effect of the present invention. A poly(vinyl alcohol) is obtained by saponifying a poly(vinyl acetate), and the degree of saponification is preferably not less than 90 percent, more preferably not less than 95 percent. If the degree of saponification is too low, the air barrier properties will decrease. Poly(vinyl alcohol)s are commercially available, for example, in the trade name of Gohsenol® from the Nippon Synthetic Chemical Industry Co., Ltd., and in the trade name of KURARAY POVAL® from Kuraray Co., Ltd. Commercially available poly(vinyl alcohol)s having a degree of saponification of net less than 90 percent include Gohsenol® N300 having a degree of saponification of not less than 98 percent sold by the Nippon Synthetic Chemical Industry Co., Ltd., and KURARAY POVAL® PVA117 having a degree of saponification of not less than 98 percent sold by Kuraray Co., Ltd., and the like.

The content of an ethylene-vinyl alcohol copolymer or a poly(vinyl alcohol) (if both an ethylene-vinyl alcohol copolymer and a poly(vinyl alcohol) are contained, the total content of the ethylene-vinyl alcohol copolymer and the poly(vinyl alcohol)) is preferably 1 to 25 percent by weight, more preferably 5 to 20 percent by weight, based on the total weight of the polyamide resin, the ethylene-vinyl alcohol copolymer, and the poly(vinyl alcohol). If the content of an ethylene-vinyl alcohol copolymer or poly(vinyl alcohol) is too low, the air barrier properties will not be improved. Conversely, if the content of an ethylenevinyl alcohol copolymer or poly(vinyl alcohol) is too high, the fatigue durability will decrease.

The thermoplastic elastomer composition may further comprise a resin other than the polyamide resin, ethylene-vinyl alcohol copolymer, or poly(vinyl alcohol) in such an amount that it may not inhibit the effect of the present invention.

In the thermoplastic elastomer composition of the present invention, the polyamide resin (B) forms a matrix phase, while the halogenated poly(isoolefin-co-p-alkylstyrene) rubber (A) forms dispersed phases.

Preferably, the halogenated poly(isoolefin-co-p-alkylstyrene) rubber (A) has been dynamically vulcanized. Dynamic vulcanization fixes rubber particles dispersed in the resin and inhibits coalescence of the rubber particles, and therefore the heat stability improves and the fatigue durability also improves.

The term "dynamic vulcanization" is used herein to indicate a vulcanization process in which an engineering resin and a vulcanizable rubber are vulcanized under conditions of high shear. As a result, the vulcanizable rubber is simultaneously crosslinked and dispersed as particles, preferably in a microgel, within the engineering resin matrix.

The dynamic vulcanization is effected by mixing the ingredients at a temperature which is at or above the curing temperature of the elastomer in equipment such as roll mills, Banbury® mixers, continuous mixers, kneaders or mixing extruders, e.g., twin-screw extruders. The unique characteristic of the dynamically vulcanized compositions is that, notwithstanding the fact that the rubber may be fully vulcanized, the compositions can be processed and reprocessed by conventional thermoplastic resin processing techniques such as extrusion, injection molding, compression molding, etc. Scrap or flashing can be salvaged and reprocessed.

When vulcanizing the halogenated poly(isoolefin-co-p-alkylstyrene) rubber (A), a vulcanization agent is added, while kneading, and the halogenated poly(isoolefin-co-p-alkylstyrene) rubber is dynamically vulcanized. Further, various compounding agents (except vulcanizing agent) for rubbers and the polyamide resin may be added during the above kneading, but preferably are mixed in advance before the kneading. The kneader used for kneading the polyamide resin and the rubber is not particularly limited. Examples thereof are a screw extruder, kneader, Banbury® mixer, twin-screw kneader/extruder, and the like. Among these, it is preferable to use a twin-screw kneader/extruder for kneading of the polyamide resin and the rubber and dynamic vulcanization of the rubber. Further, two or more types of kneaders may be used for successive kneading. As the conditions for melt-kneading, the temperature should be not lower than a temperature at which the polyamide resin melts. Further, the shear rate at the time of kneading is preferably 1000 to 7500 $sec^{-1}$. The overall time for kneading is preferably from 30 seconds to 10 minutes. Further, when adding a vulcanizing agent, the vulcanizing time after addition is preferably 15 seconds to 5 minutes.

The thermoplastic elastomer composition according to the present invention may contain, in addition to the above-mentioned essential ingredients, a vulcanizing or crosslinking agent, a vulcanization or crosslinking accelerator, various types of oils, an antiaging agent, reinforcing agent, plasticizer, softening agent, or other various additives generally mixed into general rubbers. The compounds are mixed by general methods to make the composition. The amounts of these additives added may be amounts generally added in the past so long as they do not run counter to the object of the present invention.

The thermoplastic elastomer composition of the present invention can be extruded or calendered into a film. The method for forming a film may be a usual method for forming a film from a thermoplastic resin or thermoplastic elastomer.

The thermoplastic elastomer composition of the present invention can be used suitably for an inner liner of a pneumatic tire. The pneumatic tire may be produced by a conventional process. For example, a thermoplastic elastomer composition according to the present invention is extruded into a film having predetermined width and thickness, which is then placed cylindrically onto a tire building drum as an inner liner. Thereon are laminated successively various components conventionally used for tire production, such as a carcass layer, a belt layer, and a tread layer composed of unvulcanized rubber, and the laminate is removed from the drum as a green tire. The green tire is then heated for vulcanization according to a conventional process to complete a desired pneumatic tire.

EXAMPLES (1) Raw Materials

Raw materials used in the examples were as follows:

Br-IPMS: Brominated poly(isobutylene-co-p-methylstyrene) rubber disclosed in WO 2004/058825 and WO 2004/058835.

Zinc oxide: Zinc oxide of JIS 3 grade sold by Seido Chemical Industry Co., Ltd.

Stearic acid: Stearic acid beads sold by NOF Corp.

Zinc stearate: Zinc stearate sold by Sakai Chemical Industry Co., Ltd.

Nylon 6/66 copolymer: UBE Nylon 5013B sold by Ube Industries, Ltd.

EVOH: Ethylene-vinyl alcohol copolymer Soarnol® H4815B having a content of ethylene unit of 48 percent by mole sold by the Nippon Synthetic Chemical Industry Co., Ltd.

Amine compound No. 1: Nymeen®L-202 having the formula of $R^1R^2R^3N$, where $R^1$ is $C_{12}$ alkyl, $R^2$ is —$C_2H_4OH$, and $R^3$ is —$C_2H_4OH$, sold by NOF Corporation.

Amine compound No. 2: Nymeen® S-202 having the formula of $R^1R^2R^3N$, where $R^1$ is $C_{18}$ alkyl, $R^2$ is —$C_2H_4OH$, and $R^3$ is —$C_2H_4OH$, sold by NOF Corporation.

Amine compound No. 3: Nymeen® S-220 having the formula of $R^1R^2R^3N$, where $R^1$ is $C_{18}$ alkyl, $R^2$ is —$(C_2H_4O)_n$—H, and $R^3$ is —$(C_2H_4O)_m$—H, n+m=20, sold by NOF Corporation.

Amine compound No. 4: Nymeen® O-205 having the formula of $R^1R^2R^3N$, where $R^1=C_{18}$ alkyl, $R^2$ is —$(C_2H_4O)_n$—H, and $R^3$ is —$(C_2H_4O)_m$—H, n+m=5, sold by NOF Corporation.

Amine compound No. 5: Nymeen® T2-230 having the formula of $R^1R^2R^3N$, where $R^1$ is mixed alkyls having 14, 16 and 18 carbon atoms, $R^2$ is —$(C_2H_4O)_n$—H, and $R^3$=—$(C_2H_4O)_m$—H, n+m=30, sold by NOF Corporation.

Amine compound No. 6: Nymeen® L-201 having the formula of $R^1R^2R^3N$, where $R^1$ is $C_{12}$ alkyl, $R^2$=H, and $R^3$ is —$C_2H_4OH$, sold by NOF Corporation.

Amine compound No. 7: ARMEEN® DM22 D having the formula of $R^1R^2R^3N$, where $R^1$ is $C_{22}$ alkyl, $R^2$ is methyl, and $R^3$ is methyl, sold by Lion Corporation.

Mah-EB: Maleic anhydride-modified ethylene-butene copolymer TAFMER® MH-7010 sold by Mitsui Chemicals, Inc.

(2) Preparation of Thermoplastic Elastomer Composition

Among the starting materials shown in Tables 1 and 2, the rubber was beforehand formed into the shape of pellet by use of a rubber pelletizer manufactured by the Moriyama Manufacturing Co., Ltd. The rubber pellets, the resin (nylon 6/66 copolymer), the acid-modified polymer, and the crosslinking agent (zinc oxide, stearic acid, and zinc stearate) were charged to a twin-screw kneader/extruder manufactured by the Japan Steel Works, Ltd. at a blending ratio shown in Tables 1 and 2, and were kneaded at 250° C. for 3 minutes. The kneaded materials were extruded continuously from the extruder into the shape of strand, and was cooled with water, and thereafter was cut by a cutter to obtain a thermoplastic elastomer composition in the shape of pellet.

(3) Evaluation Methods for Thermoplastic Elastomer Composition

The produced thermoplastic elastomer compositions were evaluated for dynamic fatigue durability, gas permeability, and cracks of tire after long-distance drive according to the following evaluation methods, and the results were shown in Tables 1 and 2.

[Dynamic Fatigue Durability]

The thermoplastic elastomer composition was extruded into the shape of a sheet having a thickness of 1 mm at 230° C., using a T-die extruder (a single-screw extruder having a die width of 200 mm and a diameter of 4.0 mm, manufactured by PLA GIKEN Co., Ltd). The obtained sheet was punched out to form six JIS-Type 3 dumbbell specimens, on which cyclic fatigue stress was loaded by a Constant Strain Fatigue Tester manufactured by Ueshima Seisakusho Co., Ltd. at −35° C. and a strain rate of 40%. Measurements were continued until all specimens broke, and cycle counts at breakage were Weibull-plotted. The count, at which the breakage probability reached 63.2% was determined as dynamic fatigue durability. Higher value means better dynamic fatigue durability.

[Gas Permeability]

The thermoplastic elastomer composition was extruded into the shape of a sheet having a thickness of 100 μm at 230° C., using a T-die extruder (a single-screw extruder having a die width of 200 mm and a diameter of 40 mm, manufactured by PLA GIKEN Co., Ltd). Using the obtained sheet, the air permeation coefficient in cc·cm/cm²·sec·cmHg was measured at the temperature of 30° C. according to JIS K 7126-1 (differential-pressure method). The gas permeability is expressed as relative value with that of comparative example 1 being 100, as defined by the following equation:

Gas permeability of each example=(Air permeation coefficient of each example/Air permeation coefficient of comparative example 1)×100

Lower gas permeability means better air barrier properties.

[Tire Cracks After 30,000 km Run]

Materials listed in Table 3 were charged to a twin-screw kneader/extruder manufactured by the Japan Steel Works, Ltd., at the blend ratio shown in Table 3, and were kneaded at 120° C. for 3 minutes to prepare an adhesive composition. Using a blown film machine manufactured by Placo Co., Ltd, the thermoplastic elastomer composition and the adhesive composition were extruded at 230° C. into a two-layer tube having an inner layer of thermoplastic elastomer composition and an outer layer of adhesive composition, and expanded by blowing air, folded up with a pinch roll, and wound up to obtain a laminate in the shape of tube. The obtained laminate had a thickness of the thermoplastic elastomer composition layer of 100 μm and a thickness of the adhesive composition layer of 30 μm. This laminate was placed as an inner liner on a drum for molding a tire with the adhesive composition layer being outside, i.e., on the opposite side of the drum. Thereon were laminated successively various components conventionally used for tire production, such as a carcass layer, a belt layer, and a tread layer composed of unvulcanized rubber, and the laminate was removed from the drum as a green tire. This green tire was then heated for vulcanization according to a conventional process to prepare a tire having a size of 195/65R15. The prepared tire was attached to a 15x6JJ rim with an internal pressure of 200 kPa, and was mounted to an FF automobile of 1800 cc displacement. The automobile ran was driven for 30,000 km on the road. Thereafter, the tire was removed from the rim. The laminate located at the inner surface of the tire was observed, and the number of cracks was inspected. The fewer number of cracks means better durability.

TABLE 1

| | | | Comparative Example 1 | Example 1 | Example 2 | Example 3 | Example 4 | Example 5 | Example 6 |
|---|---|---|---|---|---|---|---|---|---|
| Rubber | Br-IPMS | [parts by weight] | 100.0 | 100.0 | 100.0 | 100.0 | 100.0 | 100.0 | 100.0 |
| Crosslinking agent | zinc oxide | [parts by weight] | 5.0 | 5.0 | 5.0 | 5.0 | 5.0 | 5.0 | 5.0 |
| | stearic acid | [parts by weight] | 0.6 | 0.6 | 0.6 | 0.6 | 0.6 | 0.6 | 0.6 |
| | zinc stearate | [parts by weight] | 0.3 | 0.3 | 0.3 | 0.3 | 0.3 | 0.3 | 0.3 |
| Thermoplastic resin | nylon 6/66 copolymer | [parts by weight] | 90.0 | 90.0 | 90.0 | 90.0 | 90.0 | 90.0 | 90.0 |
| | EVOH | [parts by weight] | | | | | | | |
| Amine | Amine compound No. 1 | [parts by weight] | | 3.0 | | | | | |
| | Amine compound No. 2 | [parts by weight] | | | 3.0 | | | | |
| | Amine compound No. 3 | [parts by weight] | | | | 3.0 | | | |
| | Amine compound No. 4 | [parts by weight] | | | | | 3.0 | | |
| | Amine compound No. 5 | [parts by weight] | | | | | | 3.0 | |
| | Amine compound No. 6 | [parts by weight] | | | | | | | 3.0 |
| | Amine compound No. 7 | [parts by weight] | | | | | | | |
| Acid-modified polymer | Mah-EB | [parts by weight] | 30.0 | 30.0 | 30.0 | 30.0 | 30.0 | 30.0 | 30.0 |
| Dynamic fatigue durability | | [$10^4$ cycles] | 110 | 280 | 420 | 300 | 400 | 180 | 250 |
| Gas permeability | | [$10^{-12}$ cc · cm/ cm² · sec · cmHg] | 100 | 101 | 102 | 105 | 104 | 108 | 102 |
| Number of cracks of tire after 30,000 km run | | | 5 | 1 | 0 | 1 | 0 | 2 | 1 |

TABLE 2

| | | | Example 7 | Example 8 | Example 9 | Comparative Example 2 | Comparative Example 3 | Comparative Example 4 |
|---|---|---|---|---|---|---|---|---|
| Rubber | Br-IPMS | [parts by weight] | 100.0 | 100.0 | 100.0 | 100.0 | 100.0 | 100.0 |
| Crosslinking agent | zinc oxide | [parts by weight] | 5.0 | 5.0 | 5.0 | 5.0 | 5.0 | 5.0 |
| | stearic acid | [parts by weight] | 0.6 | 0.6 | 0.6 | 0.6 | 0.6 | 0.6 |
| | zinc stearate | [parts by weight] | 0.3 | 0.3 | 0.3 | 0.3 | 0.3 | 0.3 |
| Thermoplastic resin | nylon 6/66 copolymer | [parts by weight] | 90.0 | 90.0 | 90.0 | 90.0 | 90.0 | 90.0 |
| | EVOH | [parts by weight] | | | | | | |
| Amine | Amine compound No. 1 | [parts by weight] | | | | | | |
| | Amine compound No. 2 | [parts by weight] | 0.5 | 10.0 | 3.0 | 0.10 | 15.0 | |
| | Amine compound No. 3 | [parts by weight] | | | | | | |
| | Amine compound No. 4 | [parts by weight] | | | | | | |
| | Amine compound No. 5 | [parts by weight] | | | | | | |
| | Amine compound No. 6 | [parts by weight] | | | | | | |
| | Amine compound No. 7 | [parts by weight] | | | | | | 3.0 |
| Acid-modified polymer | Mah-EB | [parts by weight] | 30.0 | 30.0 | 30.0 | 30.0 | 30.0 | 30.0 |
| Dynamic fatigue durability | | [$10^4$ cycles] | 150 | 430 | 270 | 110 | 450 | 150 |
| Gas permeability | | [$10^{-12}$ cc · cm/ cm² · sec · cmHg] | 100 | 109 | 82 | 100 | 114 | 106 |
| Number of cracks of tire after 30,000 km run | | | 3 | 0 | 1 | 5 | 0 | 4 |

TABLE 3

| | parts by weight |
|---|---|
| Epoxidized SBS [1] | 100 |
| Zinc oxide [2] | 5 |
| Stearic acid [3] | 1 |
| Vulcanization accelerator [4] | 3 |
| Tackifier [5] | 30 |
| Total | 139 |

[1] Epoxidized SBS: Epoxidized styrene-butadiene-styrene block copolymer "EPOFRIEND" AT501 sold by Daicel Chemical Industries, Ltd.
[2] Zinc oxide: Zinc oxide of JIS 3 grade sold by Seido Chemical Industry Co., Ltd.
[3] Stearic acid: Stearic acid beads sold by NOF Corporation
[4] Vulcanization accelerator: "Nocceler" TOT-N sold by Ouchi Shinko Chemical Industrial Co., Ltd.
[5] Tackifier: YS Resin D105 sold by Yasuhara Chemical Co., Ltd.

Industrial Applicability

The thermoplastic elastomer composition according to the present invention can be favorably used as an inner liner of a pneumatic tire.

The invention claimed is:

1. A thermoplastic elastomer composition comprising (A) 100 parts by weight of a halogenated poly(isoolefin-co-p-alkylstyrene) rubber, (B) 40 to 120 parts by weight of a polyamide resin, and (C) 0.5 to 10 parts by weight of an amine having at least one hydroxyl group, wherein the amine (C) having at least one hydroxyl group is a compound represented by formula (1):

where $R^1$ is a $C_{1\text{-}30}$ alkyl; $R^2$ is $-(C_2H_4O)_n-H$, where n is an integer of 1 to 30; and $R^3$ is $-(C_2H_4O)_m-H$, where in is an integer of 1 to 30, a $C_{1\text{-}30}$ alkyl, or hydrogen.

2. A thermoplastic elastomer composition according to claim 1, wherein $R^1$ is a $C_{1\text{-}30}$ alkyl; $R^2$ is $-(C_2H_4O)_n-H$, where n is an integer of 1 to 30; and $R^3$ is $-(C_2H_4O)_m-H$, where m is an integer of 1 to 30, or a $C_{1\text{-}30}$ alkyl.

3. A thermoplastic elastomer composition according to claim 2, wherein $R^1$ is a $C_{1\text{-}30}$ alkyl; $R^2$ is $-(C_2H_4O)_n-H$, where n is an integer of 1 to 30; and $R^3$ is $-(C_2H_4O)_m-H$, where m is an integer of 1 to 30.

4. A thermoplastic elastomer composition according to claim 1, wherein the total number of oxyethylene repeating unit ($C_2H_4O$) in one molecule of the amine (C) having at least one hydroxyl group is 1 to 30.

5. A thermoplastic elastomer composition according to claim 1, wherein the alkyl has 8 to 30 carbon atoms.

6. A thermoplastic elastomer composition according to claim 1, wherein the halogenated poly(isoolefin-co-p-alkylstyrene) rubber (A) is a brominated poly(isobutylene-co-p-methylstyrene) rubber.

7. A thermoplastic elastomer composition according to claim 1, wherein the halogenated poly(isoolefin-co-p-alkylstyrene) rubber has been dynamically vulcanized.

8. A thermoplastic elastomer composition according to claim 1, wherein the polyamide resin (B) is at least one selected from the group consisting of nylon 6, nylon 66, nylon 46, nylon 11, nylon 12, nylon 69, nylon 610, nylon 612, nylon 6/66, nylon 6/66/12, nylon 6/66/610, nylon MXD6, nylon 6T, nylon 6/6T, nylon 9T, and aromatic nylon.

9. A thermoplastic elastomer composition according to claim 1, further comprising 5 to 100 parts by weight of an acid-modified polymer, based on 100 parts by weight of the halogenated poly(isoolefin-co-p-alkylstyrene) rubber (A).

10. A thermoplastic elastomer composition according to claim 9, wherein the acid-modified polymer is at least one selected from the group consisting of an acid-modified olefin copolymer, an acid-modified styrene-olefin copolymer, an acid-modified ethylene-unsaturated carboxylic acid copolymer, and an acid-modified ethylene-unsaturated carboxylate copolymer.

11. A pneumatic tire comprising an inner liner comprising a thermoplastic elastomer composition according to claim 5.

12. A pneumatic tire comprising an inner liner comprising a thermoplastic elastomer composition according to claim 6.

13. A pneumatic tire comprising an inner liner comprising a thermoplastic elastomer composition according to claim 7.

14. A pneumatic tire comprising an inner liner comprising a thermoplastic elastomer composition according to claim 1.

15. A pneumatic tire comprising an inner liner comprising a thermoplastic elastomer composition. according to claim 2.

16. A pneumatic tire comprising an inner liner comprising a thermoplastic elastomer composition according to claim 3.

17. A pneumatic tire comprising an inner liner comprising a thermoplastic elastomer composition according to claim 4.

18. A pneumatic tire comprising an inner liner comprising a thermoplastic elastomer composition according to claim 8.

19. A pneumatic tire comprising an inner liner comprising a thermoplastic elastomer composition according to claim 9.

20. A pneumatic tire comprising an inner liner comprising a thermoplastic elastomer composition according to claim 10.

\* \* \* \* \*